United States Patent [19]
Herzog

[11] Patent Number: 4,793,120
[45] Date of Patent: Dec. 27, 1988

[54] CLUTCH AND CAP DISC ASSEMBLY

[76] Inventor: Kenneth J. Herzog, 200 Mill Rd., Riverhead, N.Y. 11901

[21] Appl. No.: 138,812

[22] Filed: Dec. 24, 1987

[51] Int. Cl.[4] .......................... B67B 3/20; B65B 7/28; F16D 7/00

[52] U.S. Cl. .................................. 53/331.5; 192/56 R

[58] Field of Search ...................... 53/314, 317, 331.5; 192/0.034, 53 C, 53 F, 55, 56 R

[56] References Cited

U.S. PATENT DOCUMENTS

| | | | |
|---|---|---|---|
| 2,951,327 | 9/1960 | Fauth | 53/317 |
| 3,018,597 | 1/1962 | Hohl | 53/331.5 X |
| 4,249,397 | 2/1981 | Guerra | 53/331.5 X |
| 4,545,470 | 10/1985 | Grimm | 192/56 R |
| 4,625,843 | 12/1986 | Maltby et al. | 192/56 R X |

*Primary Examiner*—Horace M. Culver

[57] ABSTRACT

A cap disc clutch mechanism is provided in which a pair of cap disc clutch mechanisms will sense the torque between a cap and neck of a container and will allow cap tightening discs thereon to stop once the desired torque is reached and at the same time, allow the spindle shaft to still spin. The cap disc clutch mechanisms are adjustable to different torques, since the torque required for caps and containers varies considerably.

3 Claims, 1 Drawing Sheet

CLUTCH AND CAP DISC ASSEMBLY

BACKGROUND OF THE INVENTION

The instant invention relates generally to machines for putting screw caps onto containers and more specifically it relates to a cap disc clutch mechanism.

Numerous machines have been provided in prior art that are adapted to put screw caps onto containers using rotating cap tightening discs spinning in opposite directions on both the front and rear of the cap simultaneously. This can often create marring of the cap, excessive wear of the cap tightening discs themselves and thirdly and most importantly, an inconsistent tightening of caps from one container to another. For example, U.S. Pat. No. 3,905,177 is illustrative of such prior art. While these units may be suitable for the particular purpose to which they address, they would not be as suitable for the purposes of the present invention as heretofore described.

SUMMARY OF THE INVENTION

A primary object of the present invention is to provide a cap disc clutch mechanism that will overcome the shortcomings of the prior art devices.

Another object is to provide a cap disc clutch mechanism designed as a torque limiter that will eliminate the direct drive mechanically used in the prior art devices, that will sense the torque between a cap and neck of a container and will allow the cap tightening discs to stop once the desired torque is reached and at the same time, allow the spindle shaft to still spin.

An additional object is to provide a cap disc clutch mechanism that is adjustable to different torques since the torque required for caps and containers varies considerably depending upon cap material, cap liner material, diameter of the cap, pitch of the cap thread, ambient temperature and general conditions at capping time, temperature of product being filled, etc.

A further object is to provide a cap disc clutch mechanism that is simple and easy to use and resets itself automatically for subsequent capping.

A still further object is to provide a cap disc clutch mechanism that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
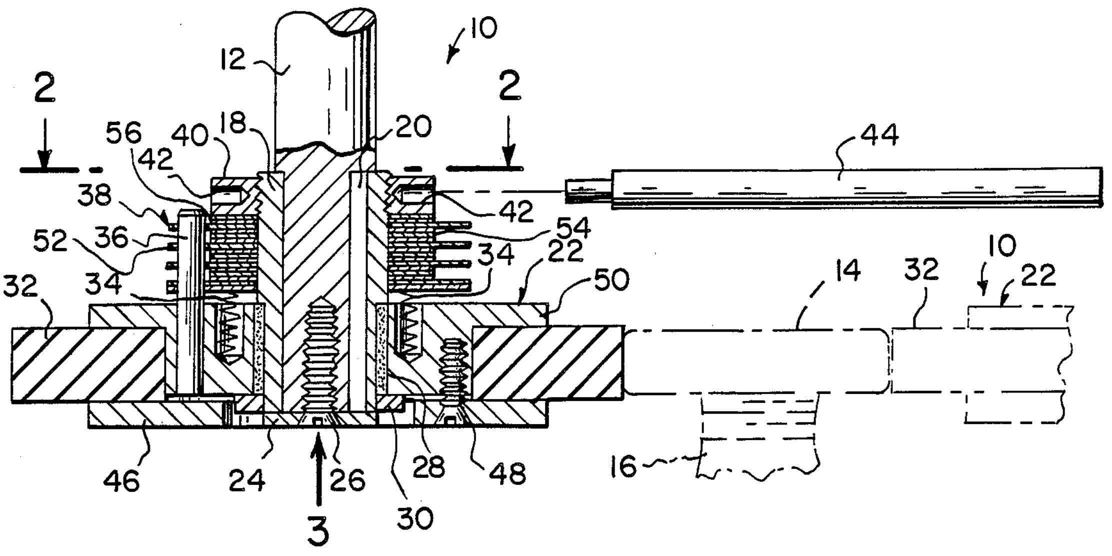
FIG. 1 is a cross sectional view of the invention with the bottle and cap in phantom.
Figure 2:
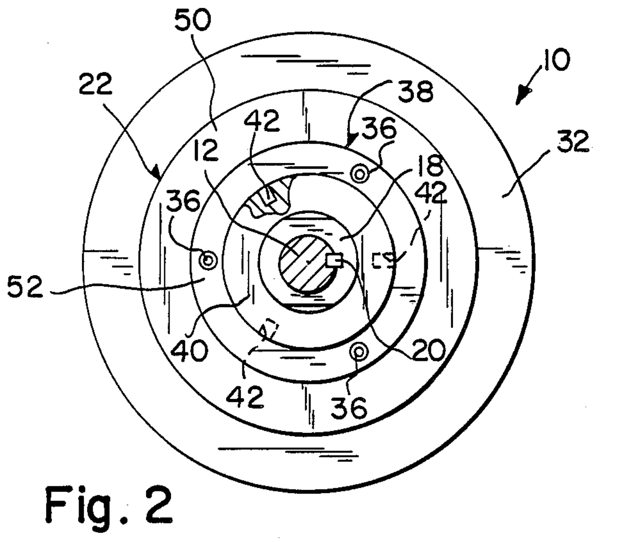
FIG. 2 is a top view taken along line 2—2 in FIG. 1 through the drive shaft.
Figure 3:
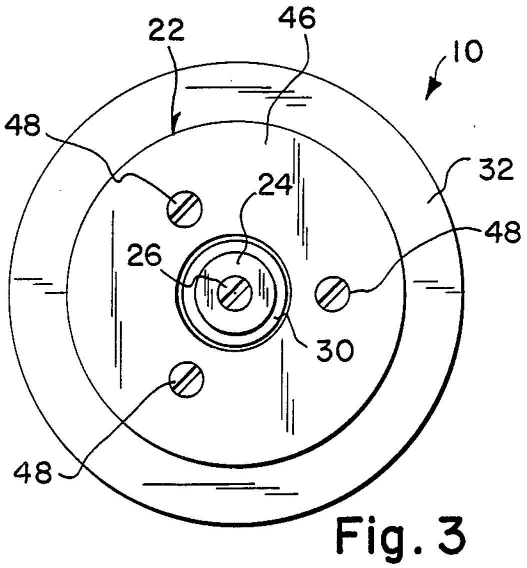
FIG. 3 is a bottom view taken in direction of arrow 3 in FIG. 1.

Turning now descriptively to the drawings, in which similar reference characters denote similar elements throughout the several views, FIGS. 1 through 3 illustrates a cap disc clutch mechanism 10. In use a pair of spaced apart cap disc clutch mechanism 10 are provided in which each are driven by a spindle shaft 12 on capper machine (not shown), so that both can act simultaneously, spinning in opposite directions, for engaging a cap 14 and tightening the cap onto a container 16 (both shown in phantom in FIG. 1).

Each of the cap disc clutche mechanisms 10 consists of a clutch hub 18 keyed at 20 onto the spindle shaft 12 which prevents movement circumferentially between the hub 18 and the shaft 12. A clutch spool 22 is attached to bottom of the spindle shaft 12 by a retaining washer 24 and clutch mounting screw 26 while at the same time rotatable about the clutch hub 18 by a bushing 28 and retaining ring 30. A cap tightening disc 32 is disposed within the spool 22 for engaging the cap 14. A plurality of springs 34 are disposed about and into top of the spool 22. A plurality of torque pins 36 are disposed about and into the top of the spool 22. A friction plate assembly 38 is disposed over the clutch hub 18 to sit upon the springs 34 and is in engagement with the torque pins 36. An adjusting nut 40 is threadable onto top portion of the clutch hub 18 and bearable onto top of the friction plate assembly 38 so that the friction plate assembly can provide torque to the torque pins 36 and into the spool 22. The adjusting nut 40 has a plurality of side apertures 42 therein. A clutch adjusting tool 44 is provided for engagement within one of the side apertures 42 in the adjusting nut 40 for turning the adjusting nut to change tension therebetween, thus varying pressure from the clutch hub 18 through the friction plate assembly 38 and into the spool 22. Both of the cap disc clutches 10 will sense the torque between the cap 14 and neck of the container 16 and will allow the cap tightening discs 32 to stop once the desired torque is reached and at the same time, allow the spindle shaft 12 to still spin.

The clutch spool 22 further includes a lower detachable flange 46 so that the cap tightening disc 32 can be installed into the clutch spool 22. A plurality of lower flange screws 48 are for securing the lower flange 46 onto upper portion 50 of the clutch spool 22 after the cap tightening disc 32 is installed thereto.

Figure 4:
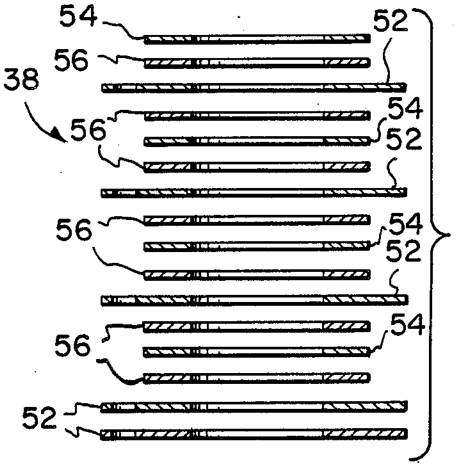
FIG. 4 is an exploded cross sectional view of the outer plates, inner plates and friction pads.

The friction plate assembly 38 as best seen in FIG. 4 includes a plurality of large plates 52, a plurality of small plates 54 and a plurality of friction pads 56. The large plates 52, the small plates 54 and the friction pads 56 are disposed over the clutch hub 18 in a stacked relationship in which generally one of the small plates 54 sits between two of the friction pads 56 and one of the large plates 52 sits between two of the friction pads 56. The large plates are in engagement with the torque pins 36 so as to provide better dissipation of heat due to friction therebetween from tee friction pads 56 and better distribution of pressure to the torque pins 36.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A cap disc clutch mechanism driven by a spindle shaft on a capper machine so that a pair of spaced apart cap disc clutch mechanisms simultaneously spinning in opposite directions, will engage a cap for tightening the cap onto a container, said cap disc clutch mechanism comprises:

(a) a clutch hub keyed onto the spindle shaft which prevents movement circumferentially between said hub and the shaft;

(b) a clutch spool attached to bottom of the spindle shaft while at the same time rotatable about said clutch hub;

(c) a cap tightening disc disposed within said spool for engaging the cap;

(d) a plurality of springs disposed about and into top of said spool;

(e) a plurality of torque pins disposed about and into the top of said spool;

(f) a friction plate assembly disposed over said clutch hub to sit upon said springs and in engagement with said torque pins;

(g) an adjusting nut threadable onto top portion of said clutch hub and bearable onto top of said friction plate assembly so that said friction plate assembly can provide torque to said torque pins and into said spool, said adjusting nut having a plurality of side apertures therein; and (h) a clutch adjusting tool for engagement within one of the side apertures in said adjusting nut for turning said adjusting nut to change tension therebetween thus varying pressure from said clutch hub through said friction plate assembly and into said spool, whereby both of said cap disc clutches will sense the torque between the cap and neck of the neck of the contair and will allow said cap tightening discs to stop once the desired torque is reached and at the same time, allow the spindle shaft to still spin.

2. A cap disc clutch mechanism as recited in claim 1, wherein said clutch spool further includes:

(a) a lower detachable flange so that said cap tightening disc can be installed into said clutch spool; and (b) a plurality of lower flange screws for securing said lower flange onto upper portion of said clutch spool after said cap tightening disc is installed thereto.

3. A cap disc clutch mechanism as recited in claim 2, wherein said friction plate assembly includes:

(a) a plurality of large plates;

(b) a plurality of small plates; and (c) a plurality of friction pads whereby said large plates, said small plates and said friction pads are disposed over said clutch hub in a stacked relationship in which generally one of said small plates sits between two of said friction pads, said large plates are in engagement with said torque pins so as to provide better dissipation of heat due to friction between said friction pads and better distribution of pressure to said torque pins.

* * * * *